Aug. 18, 1953   R. E. SHAFER ET AL   2,648,943
SUGAR CANE HARVESTER AND LOADER
Filed Dec. 15, 1949   11 Sheets-Sheet 1

INVENTOR.
Russell E. Shafer,
John E. Cary, Valerie Cary
BY Victor J. Evans & Co.
ATTORNEYS

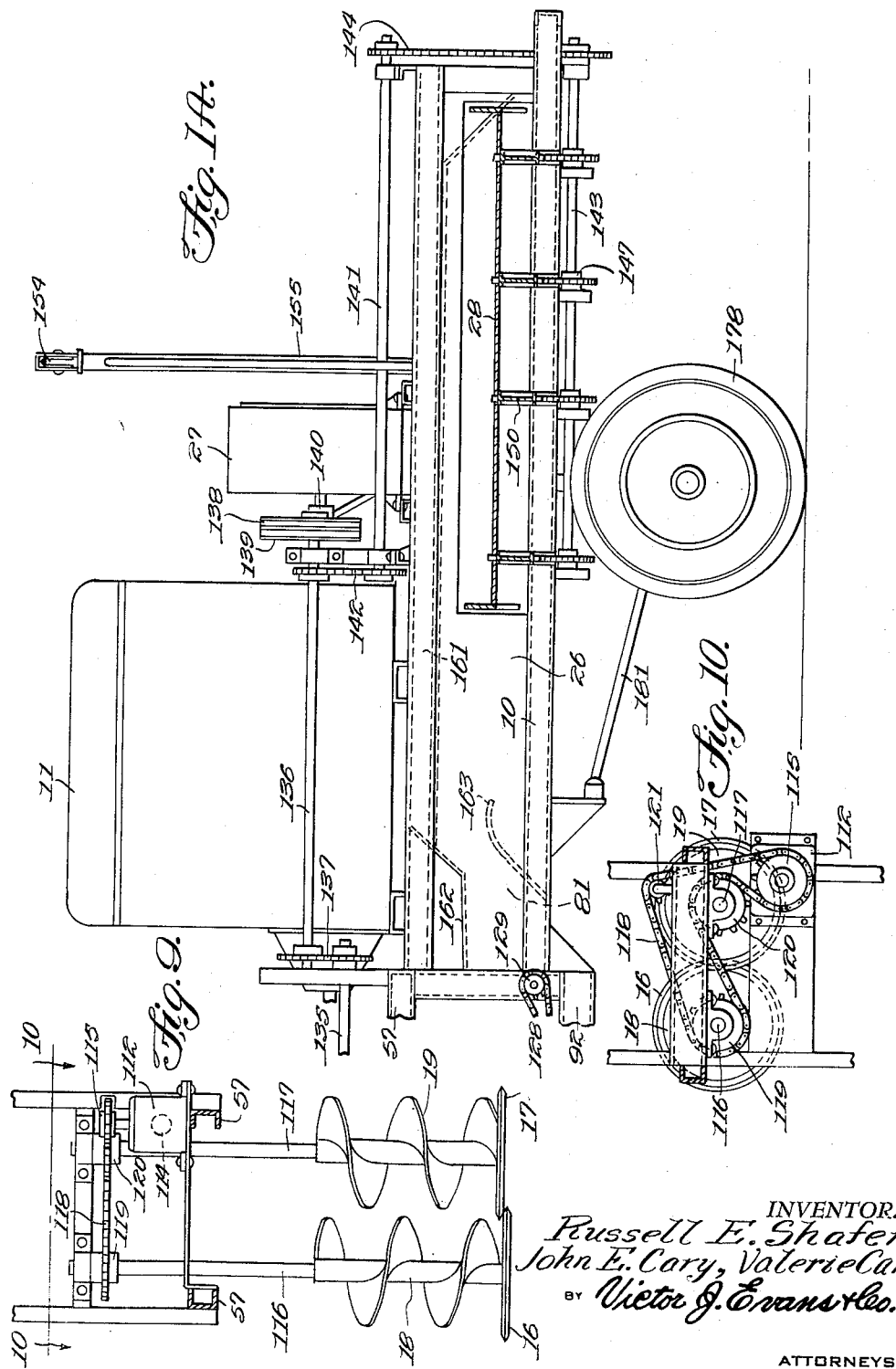

Aug. 18, 1953 — R. E. SHAFER ET AL — 2,648,943
SUGAR CANE HARVESTER AND LOADER
Filed Dec. 15, 1949 — 11 Sheets-Sheet 3

INVENTORS
Russell E. Shafer,
John E. Cary, Valerie Cary,
BY Victor J. Evans & Co.
ATTORNEYS Aug. 18, 1953   R. E. SHAFER ET AL   2,648,943
SUGAR CANE HARVESTER AND LOADER
Filed Dec. 15, 1949   11 Sheets-Sheet 6

INVENTOR.
Russell E. Shafer,
John E. Cary, Valerie Cary,
BY Victor J. Evans & Co.

ATTORNEYS

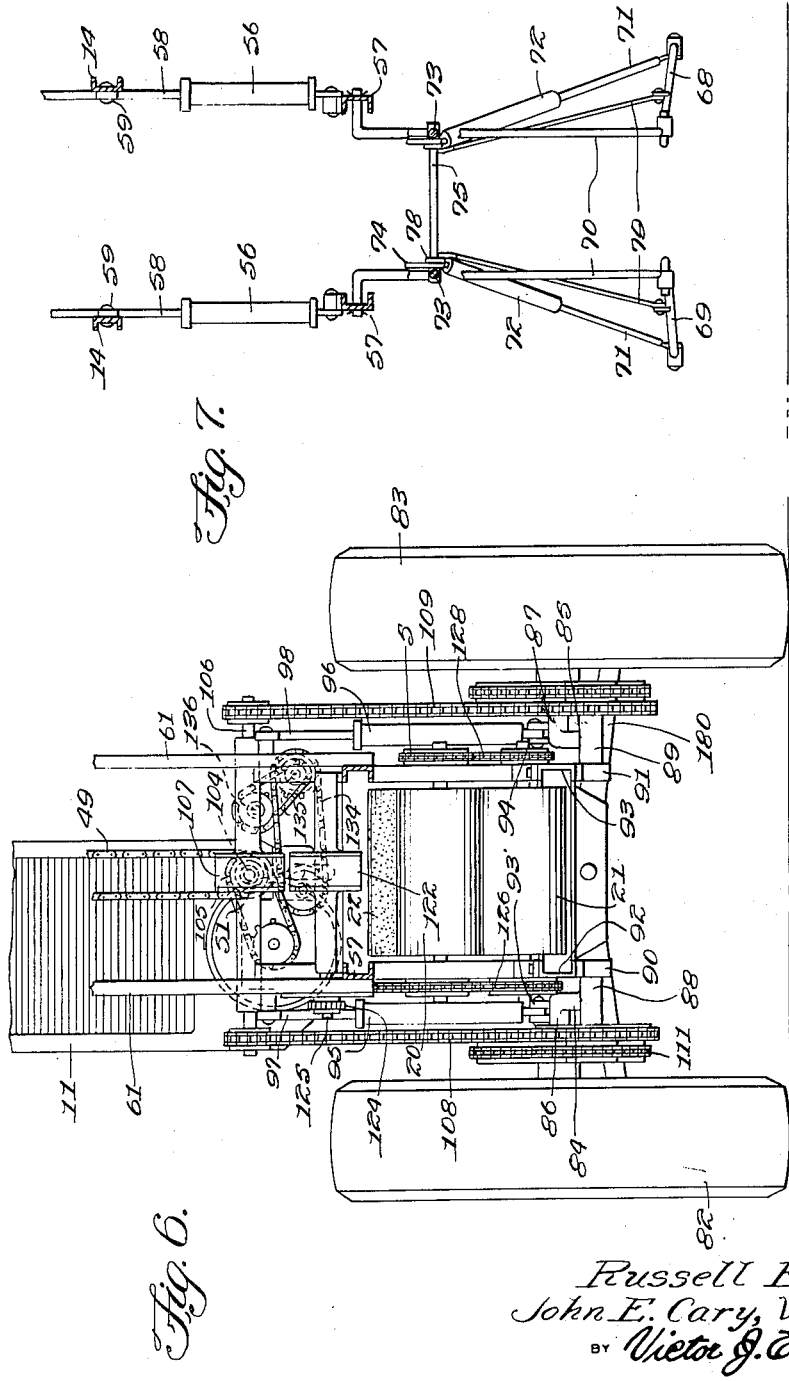

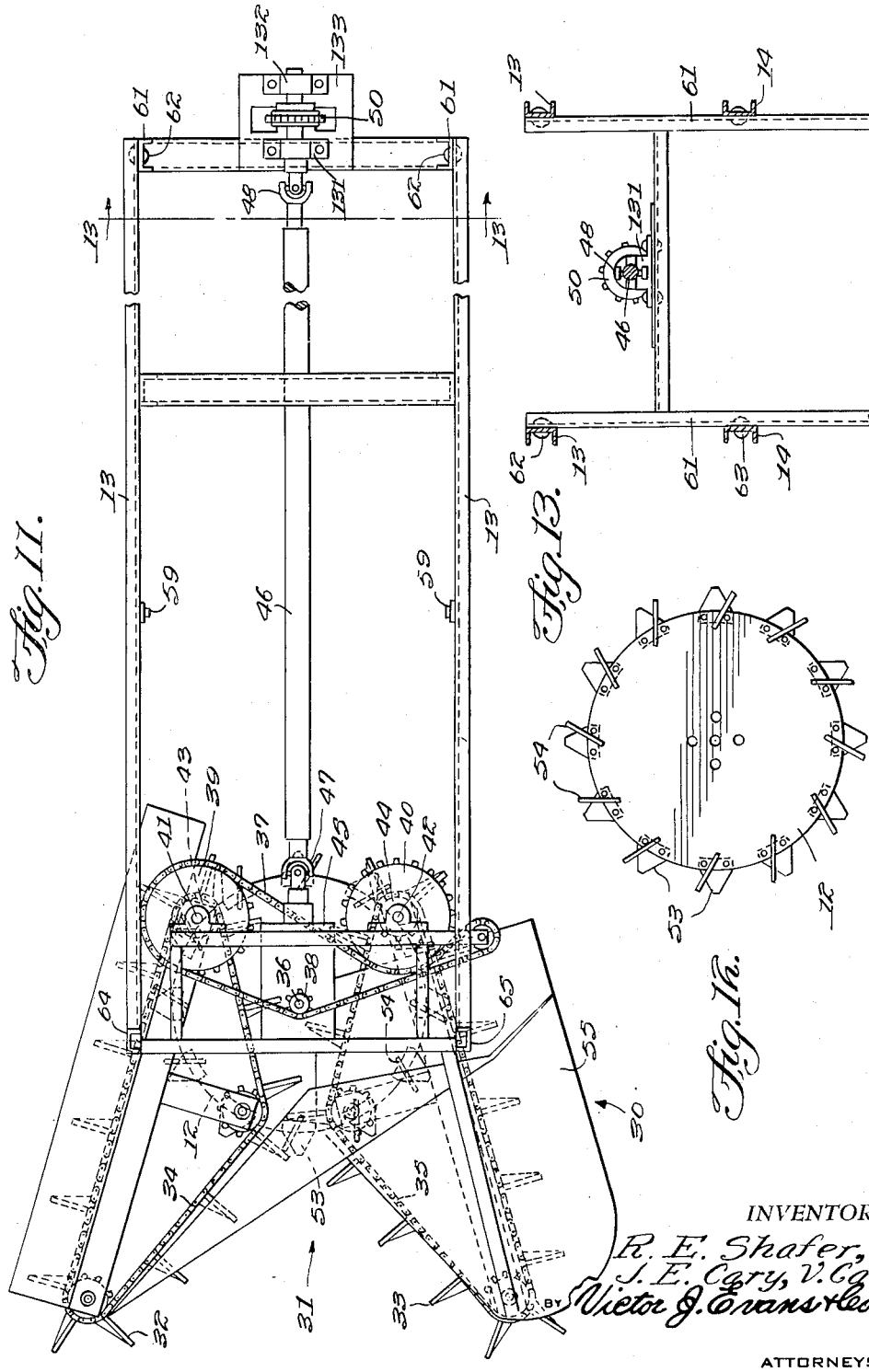

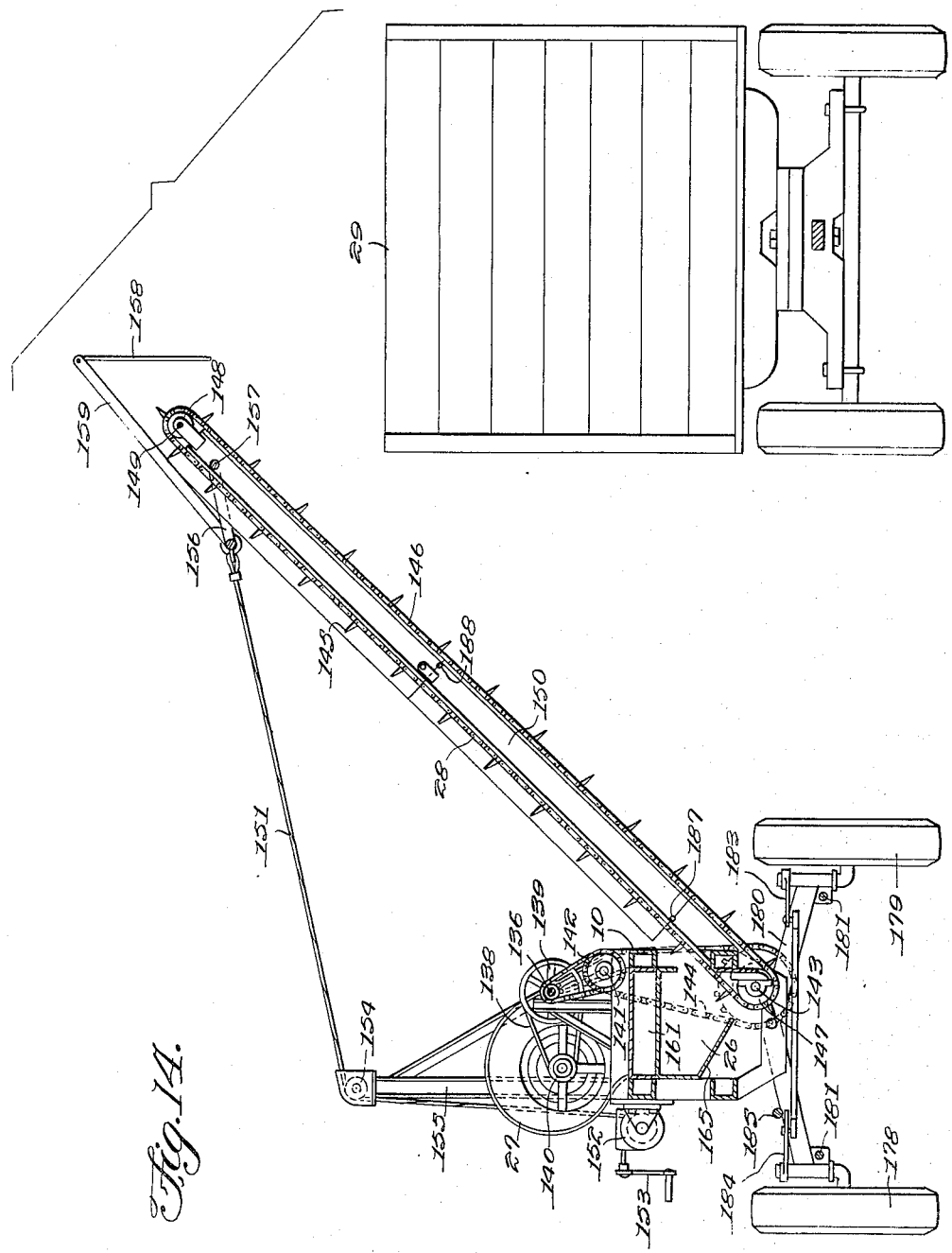

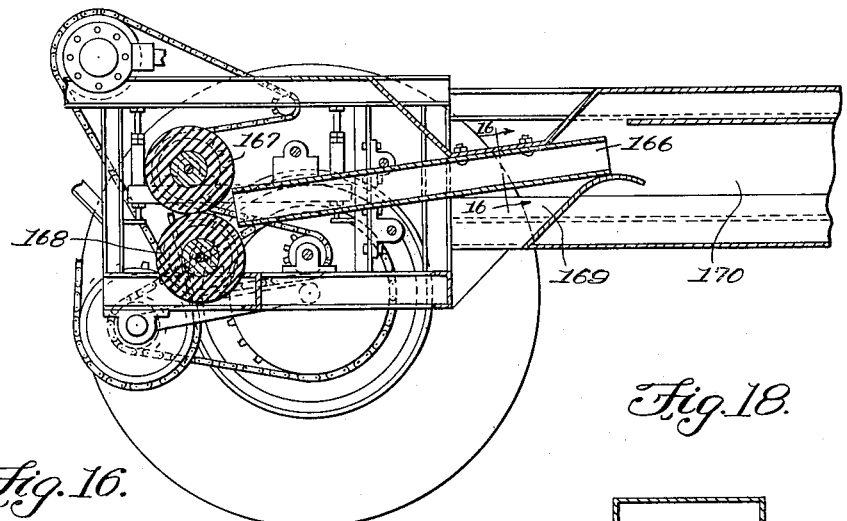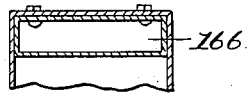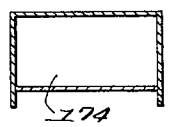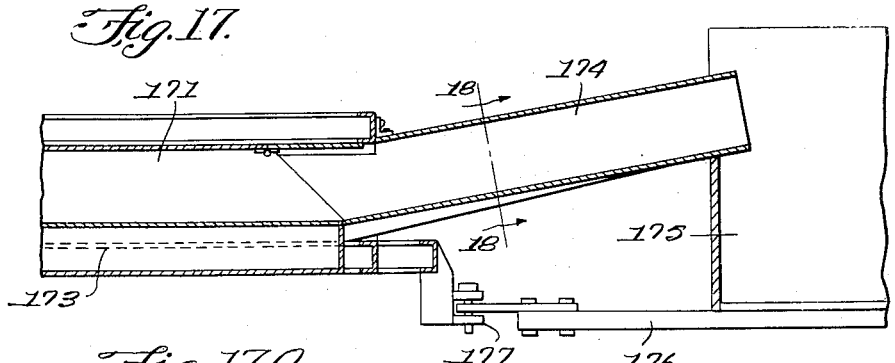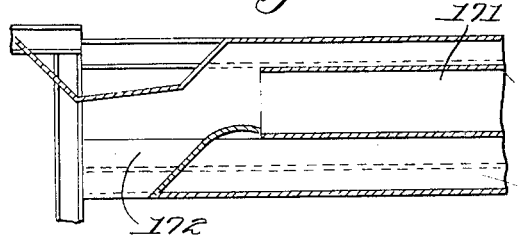

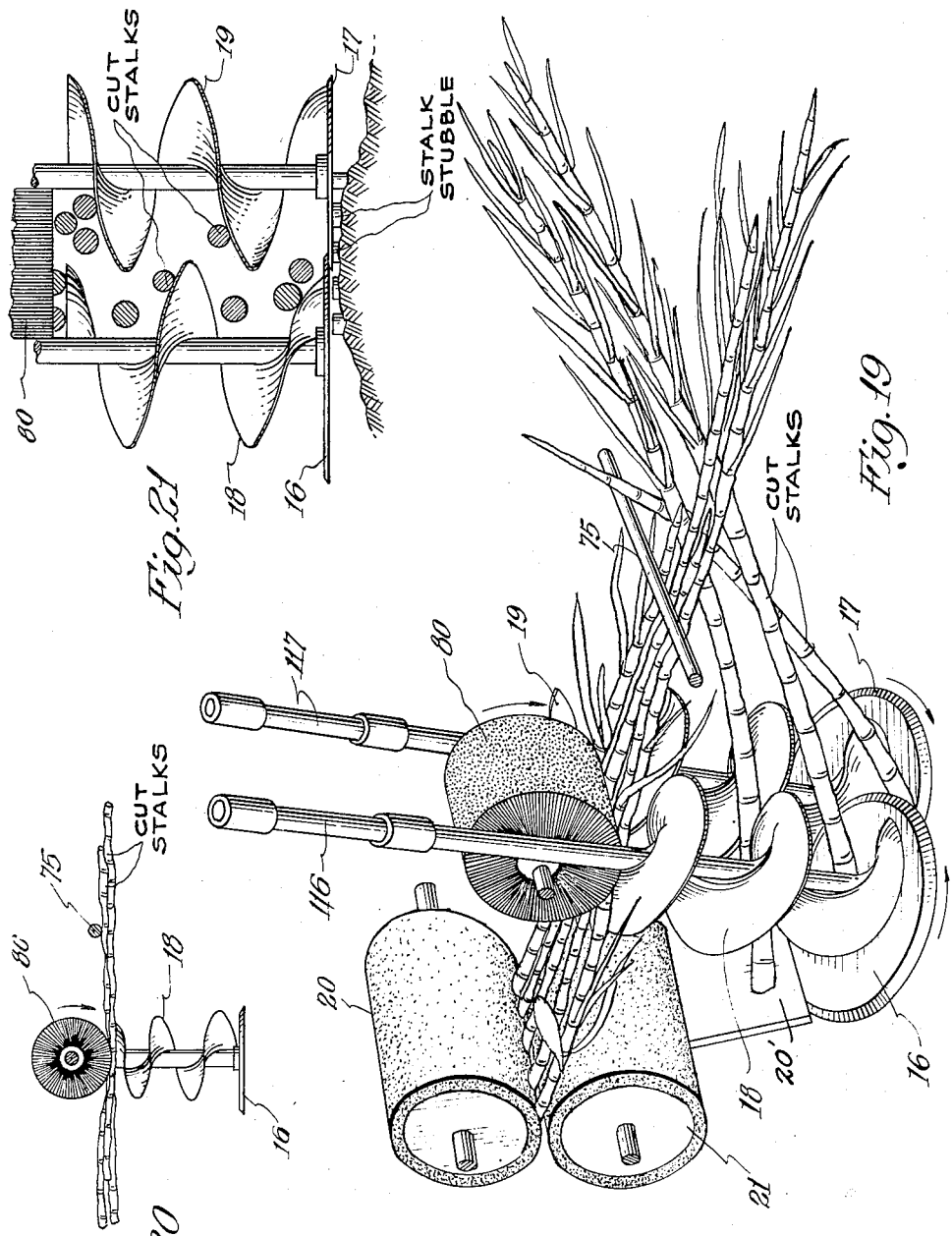

Patented Aug. 18, 1953

2,648,943

UNITED STATES PATENT OFFICE 2,648,943

SUGAR CANE HARVESTER AND LOADER

Russell E. Shafer, John E. Cary, and Valerie Cary, Opelousas, La., assignors to International Harvester Company, a corporation of New Jersey Application December 15, 1949, Serial No. 133,018

43 Claims. (Cl. 56—17)

This invention relates to farm implements of the type used for harvesting crops, and in particular a machine for cutting, topping, stripping flags or leaves for the cane, and loading the cane into a cart, truck or the like as it travels over a field of sugar cane.

The purpose of this invention is to facilitate handling of sugar cane with automatic harvesting machinery wherein the elevation of cutters for cutting the cane is readily adjustable and the means for topping the cane is also adjustable and is adjusted in relation to the top or upper end of the cane.

In the usual type of farm equipment adapted to be used for cutting sugar cane it is difficult to regulate the height of the cutters while the machine is in operation and it is also difficult to adjust the length of the tops being cut from the cane and, therefore, a large percentage of sugar cane that may be used is destroyed. With this thought in mind this invention contemplates a sugar cane harvesting machine having rotary cutters carried by a pivotally mounted frame that may be continuously adjusted through hydraulic jacks to control the elevation of the cutters and in which the topping cutters are adjustable in relation to the tip or upper end of the cane.

The sugar cane harvesting machine of this invention also includes oppositely rotating wire brushes through which the cane is passed for removing the flags or leaves and means for blowing the flags from the cane whereby the flags are deposited upon the ground.

The object of this invention is, therefore, to provide a sugar cane havesting machine that is so constructed that an operator, driving the machine across a field of sugar cane, may regulate the elevation of the cutters and also the elevation of the topping cutters in relation to the upper end of the cane, as the machine travels across the field.

Another object of the invention is to provide elevating and feeding means in a sugar cane harvesting machine whereby the cane is elevated and fed through oppositely rotating brushes for removing the flags, and then fed through flag separating equipment and conveyed to a point from which it is discharged into a cart or the like.

Another object of the invention is to provide means in a sugar cane harvesting machine for feeding the cane between pairs of rotating elements operating at different speeds for readily stripping flags from the cane.

A further object of the invention is to provide an improved sugar cane harvesting machine which is a comparatively simple and economical construction.

Another object is to provide an improved crop gathering and butt first stalk feeding means for a harvester.

Still another object is to provide an improved crop pick-up and elevating means for harvesters.

With these and other objects and advantages in view the invention embodies a substantially horizontally disposed chassis mounted on wheels with the forward end of the chassis supported through eccentrically positioned arms in combination with hydraulic jacks for controlling the elevation of the forward end by tilting the whole machine and keeping all parts in fixed relative positions, cutters suspended from the forward end of the chassis for cutting the cane, topping cutters suspended from the forward end of the chassis, and suitable elevating and conveying elements for conveying the cane through flag stripping devices for removing the flags and discharging the stripped cane into a cart, truck or the like.

Other features and advantages of the invention will appear from the following description taken in connection with the drawings wherein:

Figure 1a is a continuation of Figure 1 showing a side elevational view of the rear portion of the harvester and showing a portion of a cane elevator on the side of the harvester.

Figure 2a is a central longitudinal sectional view through that portion of the harvester shown in Figure 1a.

Figure 6 is a cross section through the forward end of the harvester being taken on line 6—6 of Figure 2.

Figure 7 is a view of the lower part of the forward end of the harvester being taken on line 7—7 of Figure 2 with parts shown in section.

Figure 8 is a cross section through the chassis of the harvester being taken on line 8—8 of Figure 2 and showing a pair of separating brushes.

Figure 9 is a cross section through the forward end of the harvester taken on line 9—9 of Figure 2, and showing the elevating screw conveyors for feeding the sugar cane to the cane feed and speed regulating rolls.

Figure 10 is a sectional plan view on an enlarged scale taken on line 10—10 of Figure 9 and illustrating the driving chain for rotating the elevating screw conveyors.

Figure 11 is an enlarged plan view showing the mounting frame of the topping cutter with the chassis of the harvester omitted.

Figure 12 is a detail showing a plan view on an enlarged scale of the cutter for removing the tops from the cane.

Figure 13 is a cross section through the rear portion of the topping cutter frame taken on line 13—13 of Figure 11.

Figure 14 is a cross section through the rear portion of the harvester taken on line 14—14 of Figure 5 showing the cane elevator for discharging the stripped cane from the harvester.

Figure 15 is a central longitudinal sectional view through the forward end of a modification of the harvester illustrating a chute for feeding the cane from speed regulating rolls to a cane elevator receiving tube with the stripping and separating brushes removed. This procedure is used to cut plant cane only.

Figure 16 is a cross section on an enlarged scale taken on line 16—16 of Figure 15 showing the chute through which the cane passes.

Figure 17 is a view on an enlarged scale and with parts broken away of a modification wherein the discharge chute is provided at the rear of the receiving tube of the harvester, for loading carts and the like at the rear of the harvester, the section being taken on the longitudinal center of the machine.

Figure 17a is a view with parts broken away showing the forward end of the receiving tube with a trough communicating with the chute shown in Figure 17.

Figure 18 is a cross section through the discharge chute taken on line 18—18 of Figure 17.

Figure 19 is a perspective view of the front end to illustrate the cutting and pick up or gather mechanism in relation to the feed throat rollers of the machine.

Figure 20 is a side elevational view of the pick up or gather mechanism in relation to a feed regulating brush or roller.

Figure 21 is a front elevational detail view of the mechanism shown in Figures 19 and 20 to illustrate the novel principle involved in elevating the severed crop material or stalks for feeding them butt end first into the harvester.

Figure 1:
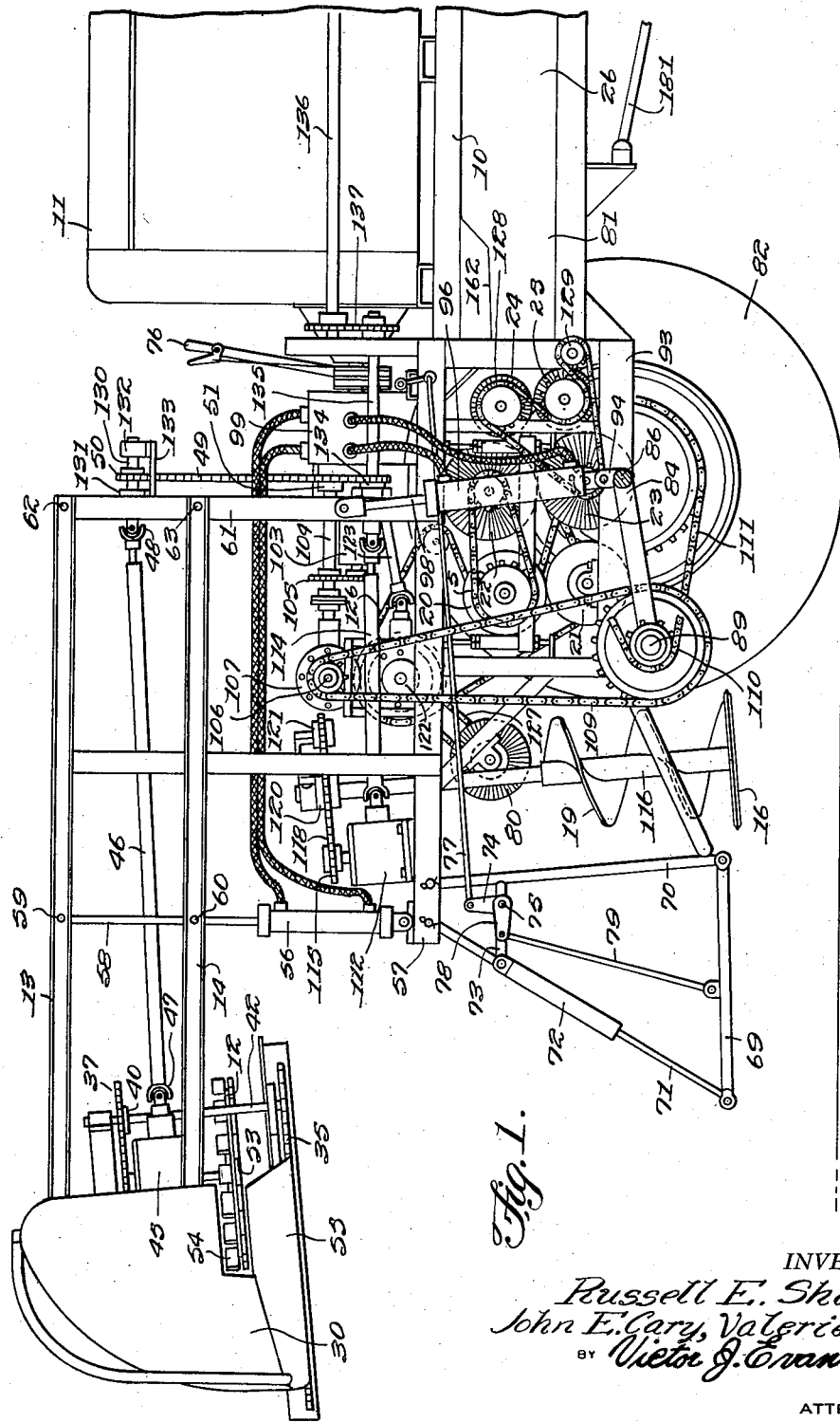
Figure 1 is a side elevational view of the forward end of the harvester with a portion of the harvester broken away.

Referring now to the drawings wherein like reference characters denote corresponding parts the combination sugar cane harvester and loader of this invention includes a main frame or chassis 10 having a motor 11 thereon that operates the different parts of the harvester, a topping cutter 12 carried by a superimposed frame having upper beams 13 and lower beams 14, rotary discs or cane cutters 16 and 17 with elevating screw or auger conveyors 18 and 19 positioned on vertical or upright axes above the cutters, oppositely rotating rubber covered cane speed or feed regulating rollers 20 and 21 positioned to receive cane between them as a feed throat at the front end of the crop treating mechanism from the elevating screws 18 and 19, the crop treating mechanism including a pair of high speed stripping wire brushes 22 and 23, wire separating brushes 24 and 25, a cane receiving section 26 with a throat in the forward end in which flags are separated from the cane by a blast of air from a blower 27, and an elevator 28 for carrying the cane away from the body or crop treating mechanism of the harvester and depositing the cane into a cart or truck 29.

As the harvester moves into the sugar cane the tops of the cane are first engaged by a topping housing 30 with the tops entering a V-shaped opening 31 in which they are gripped by fingers 32 and 33 on continuous chains 34 and 35, respectively. The fingers feed the cane to the topping cutter 12 which cuts the tops from the stalks. The cutter 12 is mounted on a shaft 36 that is rotated by an angle drive 45 from the motor 11. The cutter and feeding fingers are driven by a chain 37 traveling over a sprocket 38 on the upper end of the shaft 36 which is driven by angle drive 45, and sprockets 39 and 40 and the chain drive shafts 41 and 42, which drive the chains 34 and 35 through sprockets 43 and 44, respectively. The shaft 36 extends from the gear box or angle drive 45 through which the shaft is rotated from the motor 11 on the chassis 10 through a shaft 46. The shaft 46 is provided with universal joints 47 and 48 and this is driven by a chain 49 through sprockets 50 and 51, the sprocket 51 being mounted on a shaft 104 rotated by the motor 11 through the transmission 100.

The cutter 12 is formed with spaced knife blades 53 similar to the blades of a mowing machine and kickers 54 are provided above the blades. As the chains 34 and 35 move the cane in the V-shaped recess or opening the tops come in contact with cutter 12 and are cut off by the knife blades 53, and the bottom ends of the tops are kicked by kickers 54 to the left sliding down chute 55 from which they drop to the ground.

The elevation of the topping frame is adjustable by hydraulic cylinders 56 mounted on the forward ends of beams 57 of the chassis and connected by connecting rods 58 which are pivotally connected to the arms 13 and 14 by pins 59 and 60, respectively. The arms 13 and 14 are pivotally connected to a vertically disposed supporting frame 61 by pins 62 and 63 and to posts 64 and 65 of the topping frame by pins 66 and 67.

As the machine continues to travel forward the outwardly extended triangular shaped guides 68 and 69 pass on the sides of the row of the topped cane and the standing cane is then pushed ahead by the cross rod or some equivalent member as 75 to bend the standing stalks forwardly before they are cut by the cutters 16 and 17 which are adjusted to the desired elevation.

The guides 68 and 69 are similar and, therefore, the same reference numerals are applied to the supporting elements of each guide. The guides are supported at the rear by rods 70 and at the front by rods 71. The rods 71 telescope in tubes 72 which are pivotally attached to braces 73 connecting the rods 70 to the ends of the beams 57. Bell cranks 74 are pivotally mounted on the braces by the cross rod 75 acting also as a standing stalk bender or depresser and the cranks are actuated by a hand lever 76 through rods 77. Arms 78 of the bell cranks are connected to the guides 68 and 69 by rods 79. With the pickup guides 68 mounted on the forward ends of the beam 57 in this manner the guides can be raised or lowered in order to pick up cane that is bent or lying down as a result of storms or the like.

As the cane is cut by the cutters 16 and 17 it is fed upwardly by the screw conveyors 18 and 19 until it comes in contact with a wire feeder brush 80 which, rotating in a counterclockwise direction directs the cane rearwardly to the rubber covered cane feed and speed regulating rollers 20 and 21 from which it is fed to the stripping brushes 22 and 23, and from the brushes 22 and 23 the cane passes through the wire separating brushes 24 and 25 and into the air separating throat 81, from which it passes, to the receiving section 26 of the harvester. A downwardly inclined pan 20' or plate in a well known manner may be provided at the under side of the frame 10 to be positioned under the feed roller 21 and behind the augers 18 and 19. In some conditions such a plate prevents an occasional severed stalk from passing under the rolls 20, 21.

Figure 4:
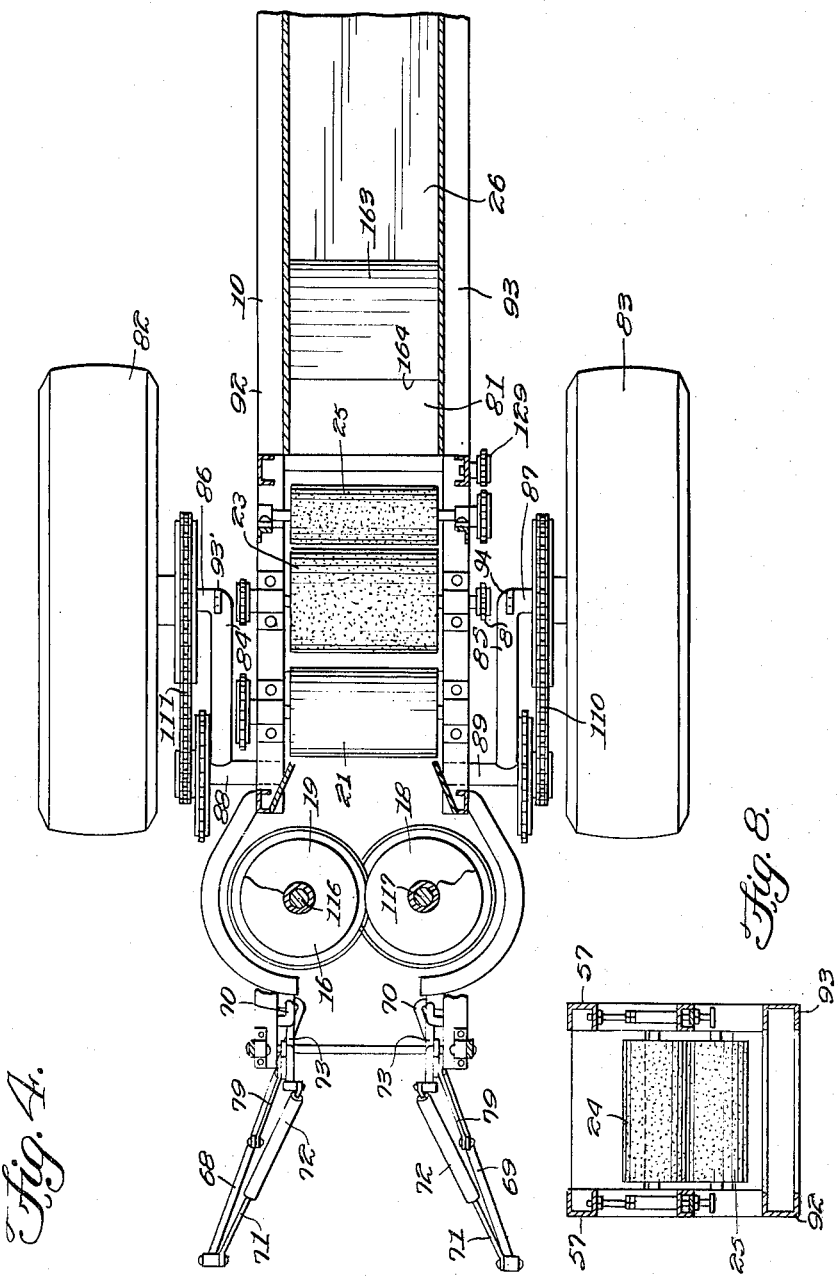
Figure 4 is a sectional view through the forward end of the harvester being taken on line 4—4 of Figure 2.
Figure 5:
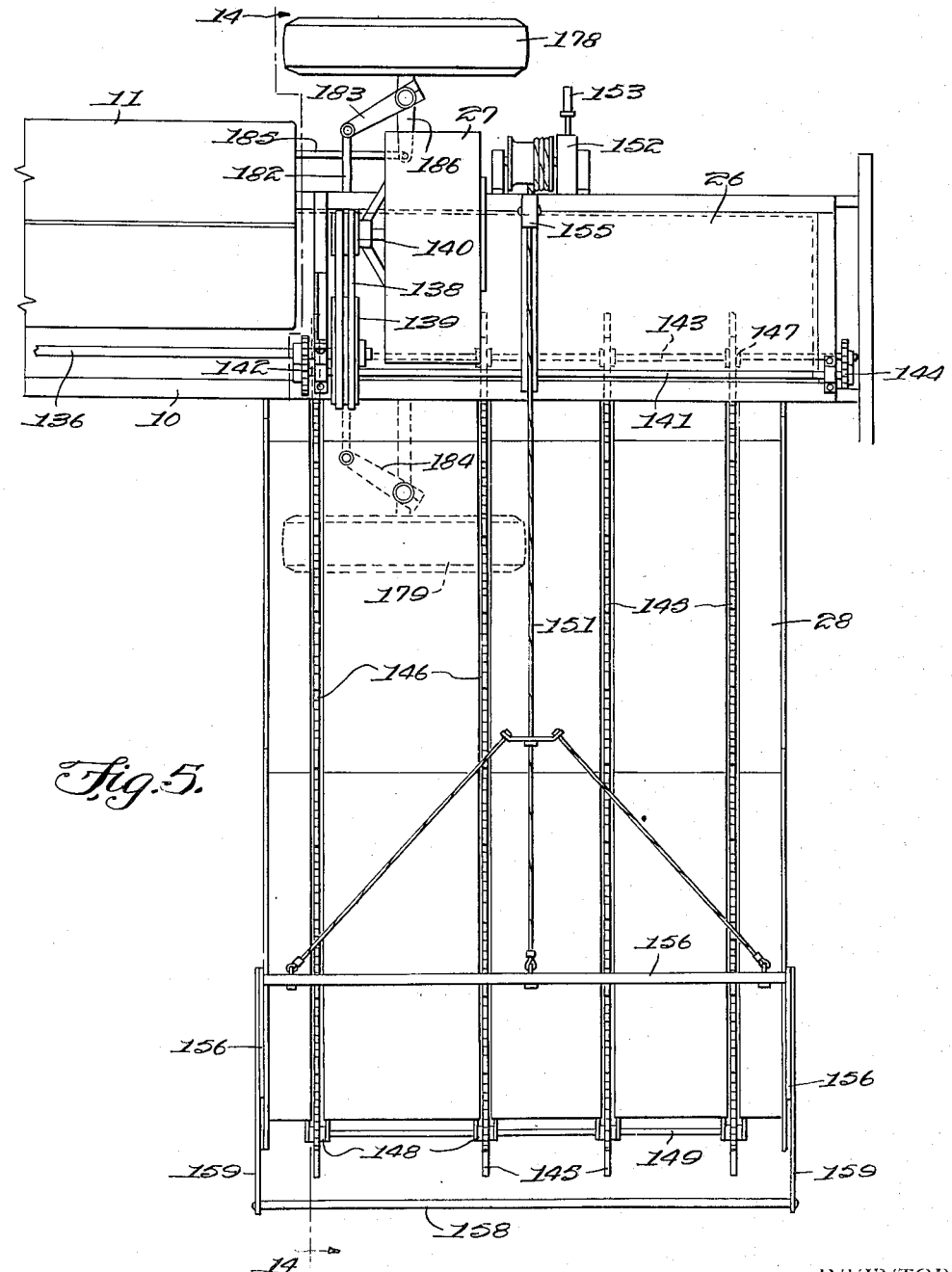
Figure 5 is a plan view on a reduced scale of the rear portion of the harvester showing the cane elevator on the side of the chassis.

The forward end of the frame or chassis of the harvester is mounted on wheels 82 and 83, as illustrated in Figure 4 through eccentric arms 84 and 85, respectively, the eccentric arms being connected, at one end, to axles 86 and 87 of the wheels 82 and 83, respectively, and at the other ends to stub shafts 88 and 89 journaled in bearings 90 and 91 on the under surfaces of lower beams 92 and 93 on the forward section of the chassis.

The axle ends of the eccentric arms 84 and 85 are connected through projections 93 and 94 to hydraulic cylinders 95 and 96, respectively and connecting rods 97 and 98 are connected to the sides of the frame 61 of the chassis 10, thereby providing means for adjusting the elevation of the forward end of the chassis of the harvester by tilting the entire frame 10 and 57 as a unit about the axle centers 86, 87. The hydraulic cylinders 95 and 96 and also the hydraulic cylinders 56 are supplied with fluid under pressure by a pump 99 on the chassis and actuated by the motor 11.

The motor 11, which may be any conventional internal combustion engine, is mounted on the chassis 10 and drives the operating instrumentalities through a transmission 100 through a flexible coupling 101. The transmission drives a power take off unit 102 and a sprocket 52 and also a double clutch 103 that operates a drive shaft 104 through a chain 105, and the drive shaft rotates an axle 106 through a differential 107.

Figure 2:
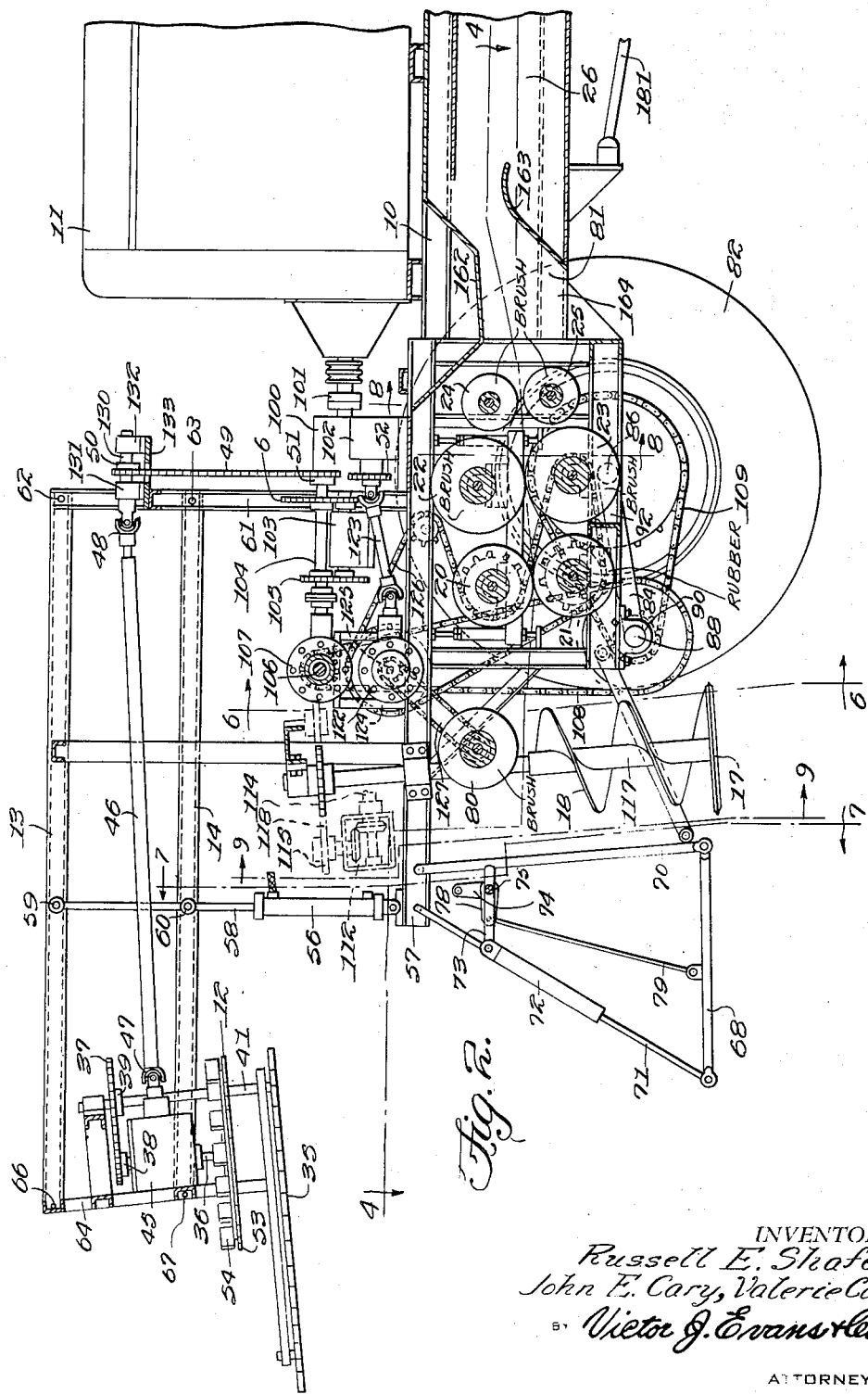
Figure 2 is a central longitudinal sectional view through the forward end of the harvester as shown in Figure 1.
Figure 3:
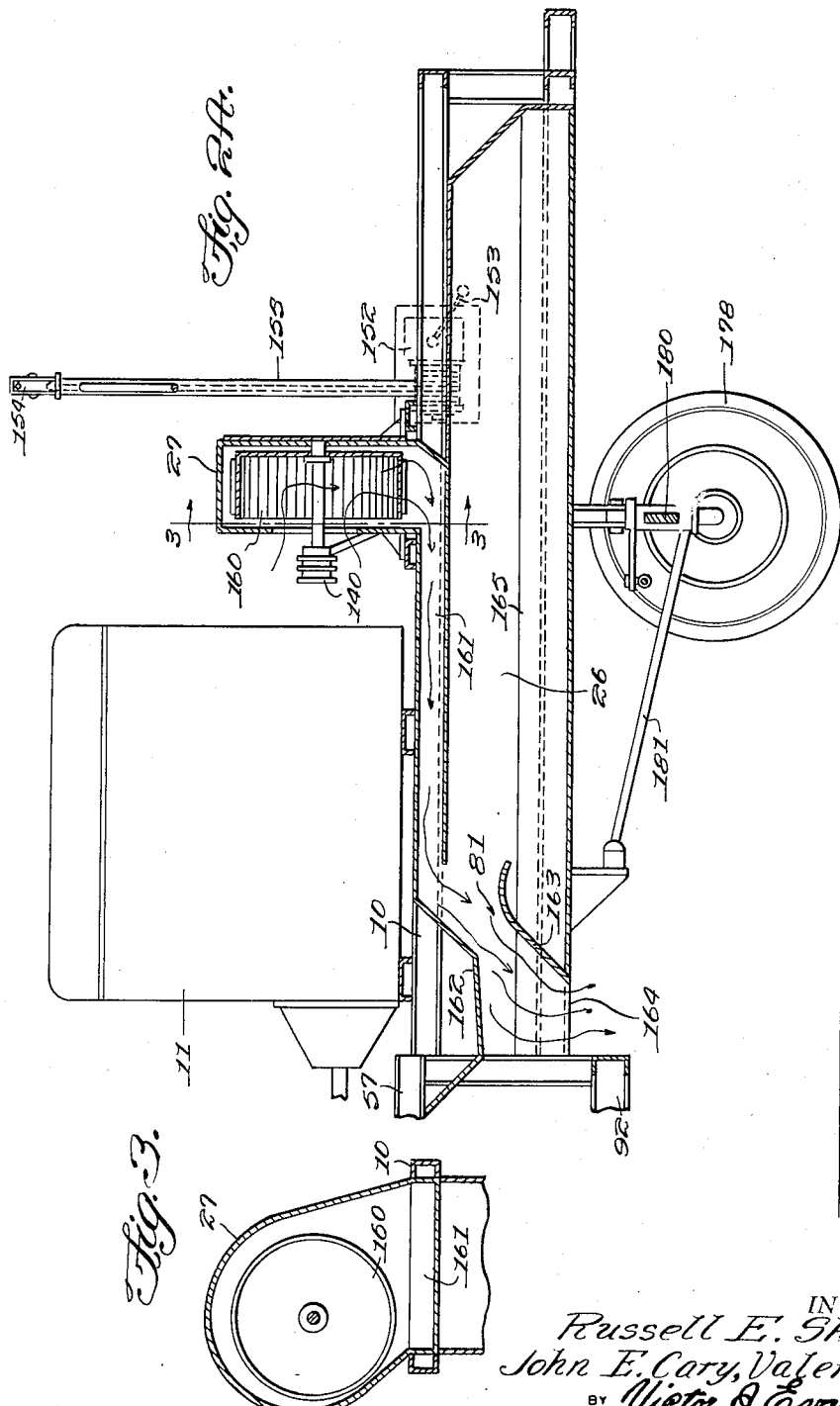
Figure 3 is a sectional view on an enlarged scale taken on line 3—3 of Figure 2a illustrating a blower for providing air under pressure to separate the flags from the cane.

The axle 106 drives the wheel 82 through chains 108 and 111 and also the wheel 83 through chains 110 and 109, the chains being trained on suitable sprockets as shown in Figures 1 and 2.

Another chain 6 similar to the chain 105 is provided at the opposite end of the double clutch 103 and with this chain also driving the drive shaft 104 it is possible to obtain a plurality of speeds through the transmission for driving the harvester.

The cutters 16 and 17 are driven from the transmission 100 through an angle drive 112 which is driven by a roller chain 134 through a shaft 114 and a sprocket 115 on the angle drive 112 drives the spindles 116 and 117 through a chain 118 which travels over the sprocket 115 and also over the sprockets 119 and 120 on the spindles 116 and 117, respectively. A takeup idler 121 is provided for taking up slack in the chain. This driving unit is illustrated in Figure 10.

The power take off 102 drives an angle drive 122 through a shaft 123, as shown in Figure 2 and a sprocket 124 on the shaft 125 of the angle drive 122 drives a chain 126 which drives the rotating lower stripping wire brush 23 and the cane speed regulating rollers 20 and 21 through suitable sprockets as shown. The brush 22 is driven from the roller 20 by a chain 5 on suitable sprockets on the shafts of the roller and brush. The wire brush 80 is also driven from the shaft 125 by a chain 127, and a chain 128 drives the separating brushes 24 and 25 from a sprocket 8 mounted on the shaft of the lower brush 23 as shown in Figure 1. The chain 128 also travels over a takeup idler sprocket 129 on the frame.

The transmission 100 drives the topping cutter through the sprocket 51 on the shaft 104 on one end thereof with the sprocket driving the shaft 46 through the chain 49 and sprocket 50, the sprocket 50 being mounted on a stub shaft 130 journaled in bearings 131 and 132 on a bracket 133.

The power take off drives the blower 27 through a chain 134 with suitable sprockets which drives a shaft 135 and, as illustrated in Figure 1a the shaft 135 drives the shaft 136 through a chain 137 with suitable sprockets. The shaft 136 drives the blower through belts 138 on pulleys 139 and 140. The shaft 136 also drives an elevator drive shaft 141 by a chain 142 with suitable sprockets and the shaft 141 drives the tail shaft 143 of the elevator through a chain 144 also trained over suitable sprockets.

The elevator 28 is mounted as illustrated in Figures 1a and 14 and flights 145 thereof are carried on chains 146 actuated by sprockets 147 on the shaft 143 with the chains traveling over sprockets 148 on a head shaft 149. The elevator is provided with suitable frame work 150 which is hinged at points 187 and 188 and the frame work is supported by a cable 151 from a winch 152, operated by a crank 153, the cable passing over a pulley 154 at the upper end of a post 155 and being connected to the frame work 150 by a bracket 156. The ends of the bracket are connected by bolts 157 and an apron 158 is suspended beyond the end of the conveyor by arms 159. Elevator 28 folds up at hinge 187 and down at hinge 188 folding elevator for convenience of travel.

The blower 27 is provided with a rotor 160 which blows air through a duct 161 into the throat 81 formed by the plates 162 and 163, as illustrated in Figure 2a and the blast of air passing across or through the throat blows the flags or leaves through a discharge opening 164 from which the trash passes to the ground.

The momentum imparted to the cane by the fast brushes 22 and 23 is sufficient to carry the cane further into the receiving tube 26 and the sloping lower sides or bottom 165 causes the cane to fall downwardly to the flights 145 of the elevator 28 whereby the cane is conveyed upwardly and deposited into the cart or truck 29.

In the modification illustrated in Figure 15 designed for handling plant cane a chute 166 is provided to guide the cane from the speed regulating rollers 167 and 168 corresponding to the rollers 20 and 21, to the throat 169 corresponding to the throat 81. The cane passes from the chute 166 into a receiving tube 170 corresponding to the chamber 26. In this modification the stripping brushes 22, 23, 24, and 25 are removed so as not to injure the stalk joints when used as plant cane. The drive belt 138 is slipped from the fan as no air is used when plant cane goes through the machine.

In the modification illustrated in Figure 17a a chute 171 extends from the throat 172 through the receiving tube 173 and, as illustrated in Figure 17 the chute or trough 171 communicates with a discharge spout 174 extended from the far end and the cane passes through the spout 174 into the body of a cart or truck 175 which may be connected to the harvester by a tongue 176 through a clevis 177.

The rear portion of the chassis in which the receiving tube 26 is positioned is supported on wheels 178 and 179 through an axle 180 as illustrated in Figures 2a and 14 and the axle may be supported by a brace 181. The wheels 178 and 179 are connected by a tie rod 182 through levers 183 and 184 to a control rod 185 through a lever 186 and the rod 185 may be connected to any suitable means for steering.

With the parts arranged in this manner the harvester is driven along a row of sugar cane and as the harvester approaches the standing cane the topping cutter 12 will first remove the upper end and with continuous movement of the harvester the cutters 16 and 17 will cut the cane close to the ground with the stalks being picked up by the elevating screw conveyors 18 and 19 and fed by the brush 80, first to the speed regulating rollers 20 and 21 and from these rollers to the brushes 22 and 23 which, rotating with a surface speed of approximately three times that of the rubber covered rollers 20 and 21 cause a stripping action pulling the flags or leaves from the cane. From the high speed stripping brushes 22 and 23 the cane passes between the two separating brushes 24 and 25 which rotate in a direction opposite to that of the brushes 22 and 23 whereby the brushes are turning in a direction opposite to the direction of travel of the cane, and whereby the separating action is accomplished.

The elevating augers 18 and 19 present relatively large horizontally disposed broad flight areas, because of their wide flight diameters as shown, for supporting the cut stalks. It is of further interest to note that the upper ends of these augers terminate at a level in substantial horizontal alinement with the level of the feed throat space between the feed throat or speed or feed regulating rollers 20 and 21. Further, the upright auger shafts 116 and 117 are laterally spaced such a distance that space is provided between them and above the augers to locate the shuffle feed or roller brush means 80 with its lower feeding surface also in substantial line with the said feed throat space. By such positioning of these parts a horizontal feed of the elevated stalks at the desired level for rapid feed directly from the tops of the augers into the feed throat and receiving chamber is assured.

From the brushes 24 and 25 the stripped cane passes through the throat 81 where the air blows the loosened flags from the cane with other trash or dirt and the stripped cane continues to the elevator by which it is deposited upon a truck or the like.

The mode of operation of the novel crop gathering, cutting, elevating and feeding mechanism for a harvester is best illustrated in Figures 19, 20 and 21 where it can be seen that as the harvester advances along a row of standing crop material such for example as the cane stalks shown, the foremost disposed cross member 75 pushes against the standing stalks, which have already been topped by the cutters 53, and bends them ahead as shown in Figure 19. As the harvester advances the disk cutters 16 and 17 driven toward each other as viewed from the front and indicated by the arrows in Figure 19 cut the bent ahead standing stalks as close to the ground as desired. See Figure 21. Since the upright screws or augers 18 and 19 may be and herein are part of and a continuation of the cutter disks 16 and 17, it follows that as soon as a bent ahead standing stalk is cut its lower end moves between the upright screws or augers in the manner shown in Figure 19 to be picked up and elevated into a substantially horizontal position. This results from the fact the peripheral or outer diameter edges of the auger flights get under the cut stalks and as the stalks move upwardly they do so without any rearward feeding movement thereof until they reach a horizontal position at the top terminal ends of the augers. Since the augers are turning quite fast and have their flights interrelated and present large diameter support areas as shown in Figure 21, these cut stalks are moved from left to right as viewed from the front in the throat or elevating space between the augers very much as though the stalks were being step-wise translated with their butt ends rearmost. As the harvester advances slowly these stalk butt ends rise without rearward movement. Eventually the cut stalks reach the upper ends of first one auger, then the other as shown in Figure 21 and if the crop is heavy these stalks disposed horizontally now, tend to build up in layers with a driven means such as the roller 80 herein disclosed as a stiff wire brush disposed at the top ends of the augers for forcibly engaging the topmost stalks and moving them butt end first rearwardly into the feed throat between the two feed rollers 20 and 21 of rubber construction for entry into the crop treating portion of the harvester. The roller brush 80 acts as a pre-cleaner of the stalks by removing some leaf matter and dirt adhering to the stalks. These rollers 20 and 21 are rubber covered or otherwise formed to make them properly aggressive and it is to be noted these rollers are rearwardly spaced from the tops of the augers 18 and 19 and at substantially the same level so that the brush roller 80 is also similarly spaced from the rollers 20 and 21. The brush roller 80 is located between the vertical axes of the spaced shafts 116 and 117 which carry the augers and may be called a shuffling member as it sloughs or deals off the stalks from the pack of elevated stalks at the upper ends of the augers 18 and 19 after the fashion of a card player dealing cards from a card pack. This results in an even uniform feed into the rollers 20 and 21 and prevents slugging or choking. The cutters 16, 17, the augers 18, 19 and the shuffle feed roller or brush 80 all keep their same positions relative to each other and adjust up and down together as a unit when the harvester main frame is tilted by the hydraulic jacks 95, 96. The forward position of this cutting and gather unit is also constant with relation to the feed rollers 20, 21. The axes of the auger shafts 116 and 117 are parallel.

The speed of rotation of the cutters 16, 17 is such that they are self-cleaning under the influence of centrifugal force so that clods, stones and foreign matter are not taken up into the machine with the crop material. Further the augers, disposed as they are and turning also at good speeds, likewise would throw off such extraneous matter. Still further the jump gap between the roller brush 80 and the feed throat rollers 20, 21 gives another opportunity for extraneous matter to fall to the ground and not be carried into the machine with the crop material.

As heretofore explained, the frame 57 is movable about the axle centers 86, 87 whereby in transport position the front end is elevated off the ground and in operating position depressed toward the ground. The lower position of the front end of the frame locates the upright augers 18 and 19 with their axes of rotation inclined upwardly forwardly as seen in Figure 2 and this inclination may obviously be varied by adjusting the position of the frame. Inasmuch as the augers 18, 19 and respective cutter disks 16, 17 are coaxial, the forward upward inclination of their axes disposes each cutter at an acute included angle with respect to the ground line and presents only narrow active front cutting edges in position to efficiently cut the stalks. Of course, the adjustment of the frame determines whether the forward edges penetrate into the ground or operate on or above the soil surface.

The forward upward slope of the augers also projects each level of the helicoidal flights forwardly of those therebelow whereby as the initial purchase of the lowermost flight segment on the stalk as it is cut is least, the elevation of the stalk concomitantly insures a more positive purchase on the stalk inasmuch as each flight level progressively advances the area of engagement of the flighting with the stalk from the butt toward the head end of the stalk. This feature prevents escape of the stalk from between the augers as it is being elevated and furthermore presents a substantial length of the stalk at the upper ends of the augers for sweeping engagement by the brush 80.

It will be understood that other modifications may be made in the design and arrangement of the parts without departing from the spirit of the invention, and that the machine can harvest other crops than sugar cane and especially other stalk crops.

What is claimed is:

1. In a sugar cane harvester, the combination which comprises a chassis mounted on wheels, horizontally disposed cane cutting rotary cutters suspended from the forward end of the harvester chassis, horizontally disposed cane speed regulating rollers mounted on the chassis to the rear of and above the rotary cutters, means including a pair of rotating interrelated augers for taking cut stalks from the cutters and delivering same between the said rollers, a pair of wire stripping brushes mounted on the chassis and positioned to follow the cane speed regulating rollers, a pair of wire brushes following the said stripping brushes and positioned with a cane receiving space between the surfaces thereof, a chamber having a throat and positioned to receive cane from the said trash separating brushes, means removing leaves and trash from the cane as it passes through the throat of the separator chamber, and an elevator carried by the chassis and positioned to receive cane from the separator chamber.

2. A stalk severing and gathering mechanism for a harvester adapted to travel along a row of standing stalks comprising a mobile support, means carried thereby in an elevated position to engage and bend forwardly the standing stalks, means positioned on the support to cut the stalks after they are bent, and a pair of side by side parallel augers arranged in an upright position on the support above the means that cuts the stalks, means to drive the augers toward one another as viewed from the front thereof, the flights of the augers presenting large diameter support areas adapted to receive the cut stalks and elevate same between them into a substantially horizontal position, and driven means positioned immediately above the augers to engage and move the stalks from such elevated position at the upper ends of the augers butt ends first into the harvester with which the gather mechanism is associated.

3. A stalk severing and gathering mechanism for a harvester adapted to travel along a row of standing stalks comprising a mobile support, means carried thereby in an elevated position to engage and bend forwardly the standing stalks, means on the support to cut the stalks while so bent, and a pair of side by side disposed augers arranged in an upright position on the support above the means that cuts the stalks, means including upright shafts to drive the augers toward one another as viewed from the front thereof, the flights of the augers adapted to receive the cut stalks and elevate same into a substantially horizontal position, and driven means disposed between the shafts immediately over the upper ends of the augers to engage and move the stalks from such elevated position at the upper ends of the augers butt ends first into the harvester with which the gather mechanism is associated, each auger shaft embodying at its lower end the cutting means whereby each auger and its cutting means rotate as a unit.

4. A stalk severing and gathering mechanism for stalk harvesters comprising a support, a pair of upright side by side disposed augers carried by the support and adapted to receive severed stalks therebetween and acting as the sole means to support and elevate same into a horizontal position, stalk severing means operatively associated with the augers and positioned therebelow whereby the augers immediately pick up the severed stalks, means to drive the augers, and driven means to engage and remove the elevated stalks from the upper or discharge ends of the augers, said latter means being positioned immediately over the upper ends of the augers and between their axes so that the elevated stalks are moved against said means by the augers.

5. A stalk severing and gathering mechanism for stalk harvesters comprising a support, a pair of upright side by side disposed augers carried on parallel axes by the support and adapted to receive severed stalks therebetween and elevate same into a horizontal position, stalk severing means operatively associated with the augers at their lower ends, means to drive the augers, and driven means to engage and remove the elevated stalks horizontally from the discharge ends of the augers, said latter means positioned between the axes of the augers and immediately over their upper ends, said augers being oppositely driven and having their respective flights so offset and interrelated that the severed stalks while horizontally elevated are engaged by the edges of the auger flights and moved from one auger to the other during elevation.

6. A stalk severing and gathering mechanism for stalk harvesters comprising a support, a pair of upright side by side disposed augers carried by the support and adapted to receive severed stalks therebetween and elevate same into a horizontal position, stalk severing means operatively associated with the augers at their lower ends, means to drive the augers at such speed that the severing means and auger flights are self-cleaning under the action of centrifugal force to remove clods and foreign matter, and driven means disposed above the tops of the augers and presenting an endless moving surface to engage and remove the elevated stalks in a horizontal direction and free the clods and foreign matter from the discharge ends of the augers, said latter means being positioned between the axes of the augers.

7. A stalk severing and gathering mechanism for harvesters comprising a pair of oppositely driven upright augers arranged in side by side relation to receive severed stalks therebetween and elevate same into a substantially horizontal position, each auger carried by a driven support including a disk cutter at the lower end thereof beneath each respective auger.

8. A stalk severing and gathering mechanism for harvesters having a frame, said mechanism comprising a pair of oppositely driven upright augers arranged in side by side relation to receive severed stalks therebetween and elevate same into a substantially horizontal position, each auger carried by a driven support carried on the frame and including a disk cutter at the lower end thereof beneath each respective auger, and means on the frame operative to raise and lower the said mechanism to vary the height at which the cutters may operate.

9. A crop gathering mechanism for a harvester having a feed throat for a crop treating means, said gathering mechanism comprising a pair of substantially upright side by side interrelated augers adapted to be carried at the front of the harvester, crop severing means operatively associated with the augers at their lower ends in a manner to enable the augers to receive the severed crop between them and elevate the same to the upper ends thereof, and a roller driven member presenting an endless surface disposed above said augers and between their axes in a position to engage the elevated crop and move same forcibly into the feed throat of the harvester directly from the upper ends of the augers.

10. A stalk gathering mechanism for a harvester having means forming a feed throat for a stalk treating means, said mechanism including a forwardly disposed elevated member to engage and deflect the standing stalks along which the harvester is movable, means to cut the standing stalks at or near the ground line while so deflected, at least a pair of substantially vertically disposed augers operatively associated with the cutting means and located immediately thereabove, adjacent augers having their flights interrelated and presenting diametrical flight areas broad enough to receive the severed stalks between them butt ends first, means to rotate the augers at such a speed as to cause their flight edges to pick up the stalks and elevate them immediately upon being cut into a horizontal position with the butt ends pointing toward the feed throat of the harvester, and a driven shuffle roller member disposed on a transverse axis substantially over the upper ends of the augers between the axes of the augers to engage and positively move the stalks directly in a horizontal position butt ends first into the feed throat of the harvester.

11. The combination set forth in claim 10 characterized further in that the stalk cutting means is disposed under each auger and is driven therewith as a unit and said units bear a definite and fixed spaced relationship to each other, to the shuffle roller member and to the feed throat of the harvester.

12. A crop gathering mechanism for a harvester having means providing a feed throat leading to a treating means which is part of the harvester, said mechanism comprising a pair of vertically disposed augers having parallel axes with their auger flights so interrelated as to receive cut crop material therebetween and elevate same to the upper ends of the augers, a cutter carried below the augers for cutting the standing crop material, means to support the augers, means to drive the augers and cutter, and driven means arranged above the augers between the axes of the augers to engage and move the crop material from the augers and to feed same into the feed throat of the harvester.

13. A crop gathering mechanism for a harvester having means providing a feed throat leading to a treating means which is part of the harvester, said mechanism comprising a pair of vertically disposed augers having their flights so interrelated as to receive cut crop material therebetween and elevate same to the upper ends of the augers, a cutter disposed under each auger for cutting the standing crop material, means to support the augers, means to support the augers and respective cutters, means to drive the augers and respective cutters as units, and driven means located between the axes of the augers and disposed over the upper ends of the augers immediately above their discharge ends in a position to engage and move elevated crop material from the upper ends of the augers directly into the feed throat of the harvester.

14. A crop gathering mechanism for a harvester having a frame and means providing a feed throat leading to a treating means which is part of the harvester, said mechanism comprising a pair of vertically disposed augers having their flights so interrelated as to receive cut crop material therebetween and elevate same to the upper ends of the augers, a movable cutter for cutting the standing crop material, means to support the augers and cutter, means to drive the augers and cutter, and driven means arranged above the augers closely adjacent their upper ends to engage and move the elevated crop material from the upper ends of the augers and to feed same into the feed throat of the harvester, the augers and driven feed means thereabove having a fixed spaced relationship to each other and to the feed throat of the harvester, and means on the frame to adjust the augers and associated feed means up and down as a unit.

15. A gathering mechanism for a stalk harvester having means providing a feed throat leading to a treating means which is part of the harvester, said mechanism comprising a support carrying a pair of vertically disposed parallel augers having their flights proximately disposed to receive cut stalks therebetween and elevate same to the upper ends thereof, a cutter operatively associated with and positioned below the augers to cut the standing stalks, a driven member presenting an endless surface and disposed above the upper ends of the augers between their axes to engage and move the stalks from the upper ends of the augers into the feed throat of the harvester, means to rotate the augers, and means to drive the driven member.

16. A gathering mechanism for a stalk harvester having means providing a feed throat leading to a treating means which is part of the harvester, said mechanism comprising a support carrying a pair of vertically disposed augers having their flights proximately disposed to receive cut stalks therebetween and elevate same to the upper ends thereof, a cutter operatively associated with each auger and positioned below the augers to cut the standing stalks, a driven member presenting an endless surface and disposed above the upper ends of the augers and between the axes of the augers to engage and move the stalks into the feed throat of the harvester, means to rotate the augers, and means to drive the driven member, said roller like member including brush elements which serve as a stalk cleaner.

17. A stalk gathering mechansm for use on the front end of a harvester having a feed throat, said mechanism comprising a pair of upright spaced supports each carrying an upright auger with a cutter disk at the bottom thereof, the augers and cutter disks on each support being interrelated to cut and elevate stalks into a horizontal position, a roller member disposed transversely above the augers to engage and move the stalks from the augers into the feed throat, and means to drive the augers, the cutter disks and the roller member.

18. A stalk gathering mechanism for use on the front end of a harvester having a frame and a feed throat, said mechanism comprising a pair of upright spaced supports adapted to be carried by said frame and each carrying an upright auger with a cutter disk at the bottom thereof, the augers and cutter disks on each support being interrelated and conjointly rotatable to cut and elevate stalks into a horizontal position, a roller member disposed transversely above the augers between the axes thereof to engage and move the stalks from the top ends of the augers into the feed throat, means to drive the said movable parts, and means on the frame to raise and lower the gather mechanism as a unit with the driven elements thereof retaining a fixed relationship to each other and spaced forwardly of the feed throat to provide a jump gap.

19. A stalk harvester comprising a mobile support to move along a row of standing stalks, a leading element in the direction of travel being carried by the support in an elevated position to deflect the standing stalks forwardly, a pair of driven augers arranged side by side in substantial vertical parallelism, a disk knife carried at the lower end of each auger, the augers having their flights disposed cooperatively to receive the cut stalks butt ends first therebetween and to elevate said stalks into a horizontal position at the upper ends of the augers, means to drive the augers and cutters, and driven means to engage and move the stalks substantially horizontally from the augers, saids means being positioned between the axes of the augers immediately above their upper discharge ends.

20. A sugar cane harvesting machine comprising a tiltably supported chassis, means to tilt said chassis to raise and lower the front end thereof, forwardly extending framework carried by said chassis for independent up and down movement, a topper carried by said framework including operative cutting means to sever the tops of standing cane stalks before they are severed at their butt ends, means controlled by an operator on said chassis to raise and lower the front end of the chassis and the topper as desired, a butt cutter operatively carried by the front end of the chassis to move up and down therewith, said butt cutter disposed rearwardly of the topper to cut the butt ends of standing stalks after they are topped, means carried in an elevated position forwardly of the butt cutters to bend the topped standing stalks before severance of their butts; upright auger means operatively associated with the butt cutter on parallel axes to receive and vertically elevate severed and topped stalks into a substantially horizontal position, means forming a feed throat on the chassis rearwardly of the cut stalk elevating means at the level of the upper discharge ends of the auger means, means to move the elevated cut stalks horizontally and rearwardly from the auger means into said feed throat, and a stalk treating mechanism disposed rearwardly of the feed throat to reveice the stalks from the feed throat with said stalks passing horizontally rearwardly through said treating means.

21. The structure defined in claim 20 characterized further by the fact that the means for separately raising and lowering the chassis front end and the topper include hydraulic cylinders and the means is held in operator selected positions of adjustment by the trapped hydraulic fluid column.

22. A crop gathering mechanism for harvesters including a support and comprising a pair of oppositely driven upright augers carried by the support on parallel axes and arranged in side by side interrelated relation to receive severed crop material therebetween and operable as the sole means to elevate the material to the upper ends of the augers, and driven means located between the axes of the augers and operable adjacent and above the upper ends of said augers and presenting an endless moving surface above the augers for discharging the elevated crop material from the upper ends of said augers.

23. A crop gathering mechanism for harvesters including a support and comprising at least one rotatably driven upright auger carried by the support, means reacting and cooperating with said auger and defining an elevating passage therebetween, said mechanism adapted to receive and elevate severed crop material to the top of the auger, and means presenting an endless moving surface above and adjacent the upper end of said auger and said means cooperating with auger for discharging crop material elevated thereby, said latter means positioned to have the discharge end of the auger press the elevated material directly thereagainst.

24. A harvester adapted to move through crop material including a support, driven disc means carried by the support to receive severed crop material at or near the ground line, driven auger means disposed in an upright position above the disc means to receive and elevate the crop material from said disc means, and driven means presenting an endless moving surface over the auger means to engage and move the crop material from its elevated position on the driven auger means to clear the auger means, the auger means acting the press the elevated material against said endless moving surface.

25. In combination with a harvester having crop receiving means, a crop pick up and gatherer carried by the harvester proximate said crop receiving means, the pick up and gatherer comprising a pair of upright augers driven oppositely and having their flights intercalated to elevate and support loose crop material received between, disc means carried at the lower ends of the respective augers, and driven means carried proximate the upper ends of the augers to discharge the elevated crop material therefrom and direct same to the crop receiving means.

26. In a standing stalk crop harvester, a mobile support adapted to travel along the crop rows, a pair of upright side by side augers carried by the support and spaced to provide an elevating zone between their axes with the auger flights of the opposed augers interrelated to provide continuously upward moving support areas for severed stalks, means to sever the standing stalks at their butt ends underneath the augers whereby the lower ends of the augers immediately engage the severed stalks, means to drive the augers oppositely and toward each other so that the augers function as the sole means to elevate the stalks to the upper ends thereof, said harvester having a feed throat to receive the severed elevated stalks and positioned rearwardly of the upper ends of the augers, and driven means on the support positioned immediately above the augers and presenting a continuous moving surface above the augers whereby the stalks elevated to the upper ends of the augers are pressed against said means and engaged by the under portion of the continuous moving surface to forcibly discharge the stalks from the augers and feed them into the feed throat of the harvester.

27. The mechanism defined in claim 26 characterized in that means is carried by the support and acts to engage standing stalks and deflect and tilt them forwardly ahead, the standing stalks being severed by the severing means while so deflected whereby the augers immediately pick up and elevate the severed stalks upon being cut into a horizontal position and the continuous moving surface of the driven means engages the elevated stalks and delivers them from the upper ends of the augers horizontally into the feed throat of the harvester.

28. A stalk severing and gathering mechanism for a harvester comprising a pair of oppositely driven upright augers arranged in side by side relation to receive severed stalks therebetween and elevate same loosely into a substantially horizontal position, each auger carried by a driven support including a disk cutter at the lower end thereof beneath each respective auger, said disk cutters being of larger diameter than the diameter of the respective augers so that a standing stalk is severed before it is engaged by the elevating augers.

29. For a stalk crop harvesting machine comprising a movably supported frame and means operatively associated with the frame to raise and lower the front end thereof, a gatherer carried by the frame and comprising a plurality of oppositely driven upright augers having parallel axes and flights positioned side by side, the flights of respective adjacent augers arranged in vertically staggered relation and adapted to receive severed crop stalks therebetween at the lower ends thereof and operable to elevate the stalks from said lower to the upper discharge ends of the augers, said frame in the lower location of the front end thereof disposing said augers with their axes of rotation inclined upwardly and forwardly whereby each flight level is projected slightly forwardly of the one therebelow so as to progressively shift from the butt toward the head ends of the stalks the area of engagement of the flights therewith as the stalks are being elevated whereby increasing the purchase of the flights with respect to the stalks.

30. For a stalk crop harvesting machine comprising a movably supported frame and means operably associated with the frame to raise and lower the front end thereof, a gatherer carried by the frame and comprising a pair of rotatable oppositely driven upright augers having parallel axes, a cutter disc at the lower end of each auger, a common driven support for each auger and cutter disc therebeneath and forming the axis of rotation therefor, at least one cutter disc being of larger diameter than the diameter of the associated auger and arranged in overlapping relationship with the other cutter disc, said frame when lowered at its front end inclining the axes of rotation of the augers and cutters upwardly and slightly forwardly whereby disposing said cutters at an acute included angle with the ground for severing the stalks at the ground line, each auger having a helicoidal flight, the flights of respective augers being arranged in adjacent vertically offset relationship and functioning to receive the butt ends of the stalks at the lower ends thereof between them and elevate the stalks to the tops of the augers while simultaneously due to said inclination advancing onto said stalks whereby obtaining a more positive purchase thereon.

31. A stalk gathering mechanism for harvesters comprising a pair of oppositely driven upright augers arranged in adjacent relationship on parallel axes and each comprising a helicoidal flight, the flights of respective augers arranged to pass by each other in vertically stepped relation and adapted to receive tilted severed stalks therebetween at the lower ends thereof and elevate the loose stalks to the upper ends of the augers for discharge therefrom, said augers each including a disk at its lower end and being inclined upwardly forwardly whereby during elevation of each stalk the augers and their disks simultaneously advance onto the stalk to obtain a more positive purchase thereon.

32. A sugar cane harvesting machine comprising a wheel supported chassis, a pair of laterally spaced vertically disposed driven shafts operatively mounted on the forward portion of the chassis, a stalk cutting knife carried by the lower end of each shaft, an auger carried by the lower portion of each shaft and extending upwardly from said knives, driven means carried between the upper ends of the auger shafts above the upper ends of the augers and acting to shuffle the horizontal cut stalks as they reach the upper ends of the augers rearwardly, a pair of vertically alined speed rollers mounted on transversely disposed shafts, said rollers having their adjacent surfaces in substantially horizontal alinement with the lower portion of said driven means and the top portion of said augers, stalk treating means positioned on the chassis rearward of and at the level of the speed rollers horizontally to receive the stalks fed horizontally rearwardly from between the speed rollers, and means on the rearward end of the chassis to receive the treated stalks and discharge same from the machine.

33. For a mobile harvester having a frame and crop-treating means disposed at a certain level, a crop gathering mechanism carried on a forward part of the frame ahead of the treating means to move with the harvester along a row of growing crop material, said mechanism comprising a transversely disposed elevated means to engage and bend forwardly in the line of travel the standing crop material, means included in said mechanism to cut the standing crop material at or near the ground line after and while it is so bent forwardly, driven augers disposed in substantially parallel upright position and presenting large flight diameter areas, the augers being positioned above the cutting means and cooperating to receive the loose cut material between them and elevate from the ground cutting level to the level of the treating means at the upper ends of the augers, and driven means included in the mechanism and disposed adjacent the upper ends of the augers in a manner to have the material elevated by the augers be directly moved horizontally rearwardly from the augers to the treating means.

34. For a mobile harvester having a frame and crop treating means disposed thereon at a certain level with a feed throat leading thereinto, a crop gathering mechanism carried on a forward part of the frame ahead of the treating means to move with the harvester along a row of growing crop material, said mechanism comprising a transversely disposed elevated means to engage and bend forwardly in the line of travel the standing crop material, means to cut the standing crop material at or near the ground line after and while it is so bent forwardly, a pair of vertically disposed driven augers arranged side by side and presenting proximately disposed large diameter flight areas, the augers being positioned above the cutting means and cooperating to receive and take directly from the cutting means the loose cut material and elevate it between them over their flight areas from the ground cutting level to the level of the treating means at the upper ends of the augers, and driven means disposed over the upper ends of the augers so that the elevated material is moved thereagainst and is positively moved by said driven means horizontally rearward off the augers and into the feed throat.

35. A stalk gathering mechanism for use on the front end of a harvester having a feed throat, said mechanism comprising a pair of upright spaced supports each carrying an upright auger with a cutter disk at the bottom thereof, the augers and cutting disks on each support having their respective cutting edges and auger flights adjacently and cooperatively disposed to cut and then elevate severed stalks between the augers upwardly into a horizontal position, a driven means having a transverse axis and located immediately above the upper terminal or discharge ends of the augers to engage and move the stalks from the tops of the augers horizontally into the feed throat, and means to drive the augers, the cutter disks and the driven means.

36. A stalk severing and gathering mechanism for harvesters comprising a pair of oppositely driven upright augers arranged in side by side relation to receive severed stalks therebetween and elevate them into a substantially horizontal position preparatory to further treatment, and stalk cutting mechanism located adjacent said augers and cooperating therewith in the progressive treatment of the stalks.

37. A stalk severing and gathering mechanism for harvesters comprising a pair of oppositely driven upright augers arranged in side by side relation to receive severed stalks therebetween and elevate them into a substantially horizontal position preparatory to further treatment, and a disk operatively associated with the lower end of each auger.

38. A stalk severing and gathering mechanism for a harvester comprising a driven upright auger to receive severed stalks and elevate them into a substantially horizontal position preparatory to further treatment, means adjacent to said auger and cooperating therewith for limiting lateral movement of the stalks as they are being elevated, and a disk operatively associated with the lower end of the auger.

39. A crop severing and gathering mechanism for harvesters comprising a pair of oppositely driven upright augers arranged in side by side relation to receive severed crops therebetween and elevate same in a loose condition to be progressively fed preparatory to further treatment, and a disk operatively associated with the lower end of each auger.

40. A stalk gathering mechanism for use on the front end of a harvester having a feed throat, said mechanism comprising a pair of oppositely driven upright augers arranged in side by side relation to receive severed stalks therebetween and elevate same into a substantially horizontal position, stalk cutting means located adjacent said augers and cooperating therewith in the progressive treatment of the stalks, a member above said augers to engage and move the stalks from the augers into the feed throat, and means to drive the augers, cutting means and transversely disposed member.

41. In combination with a harvester having crop receiving means, a crop pickup and gatherer carried by the harvester proximate said crop receiving means, the pickup and gatherer including a driven upright auger to elevate and support loose crop material received thereby, means adjacent to said auger and cooperating therewith to guide the upward movement of said loose crop material, disc means carried at the lower end of said auger, and driven means carried proximate the upper end of said auger to discharge the elevated crop material therefrom and direct same to the crop receiving means.

42. A stalk severing and gathering mechanism for harvesters which move along a row of standing stalks, said mechanism including a leading member carried by said harvester to deflect the standing stalks forwardly, driven upright auger means to receive severed stalks and elevate them into a substantially horizontal position preparatory to further treatment, and disk means operatively associated with the lower end of the auger means.

43. A stalk severing and gathering mechanism for harvesters which move along a row of standing stalks, said mechanism including a driven first leading member carried by said harvester at one elevation for topping the standing stalks, a second leading member carried by said harvester at a lower elevation and disposed rearwardly of the first leading member to engage and deflect the standing stopped stalks forwardly, driven upright auger means to receive severed stalks and elevate them into a substantially horizontal position preparatory to further treatment, and disk means operatively associated with the lower end of the auger means.

RUSSELL E. SHAFER.
JOHN E. CARY.
VALERIE CARY.

(References on following page)

References Cited in the file of this patent

UNITED STATES PATENTS

| Number | Name | Date |
|---|---|---|
| 957,441 | Peters | May 10, 1910 |
| 1,139,756 | Doze | May 18, 1915 |
| 1,192,644 | Kite | July 25, 1916 |
| 1,457,827 | Erb | June 5, 1923 |
| 1,459,247 | Pazos | June 19, 1923 |
| 1,583,510 | Wilkes et al. | May 4, 1926 |
| 1,664,203 | Flynn | Mar. 27, 1928 |
| 1,714,272 | Luce | May 21, 1929 |
| 1,808,113 | Howard | June 2, 1931 |
| 2,141,557 | Reiter | Dec. 27, 1938 |
| 2,179,584 | Bourg | Nov. 14, 1939 |
| 2,208,287 | Cochrane | July 16, 1940 |
| 2,281,904 | Wuertele | May 5, 1942 |
| 2,442,520 | Van Sickle | June 1, 1948 |
| 2,477,794 | Gehl | Aug. 2, 1949 |